April 4, 1961 R. J. ANDERSON ET AL 2,977,820
GROUND POWER DEVICE
Filed April 5, 1957 3 Sheets-Sheet 1

Inventors
ROBERT J. ANDERSON
JOSEPH T. HAMRICK
FRANK L. OPPENHEIMER
Attys.

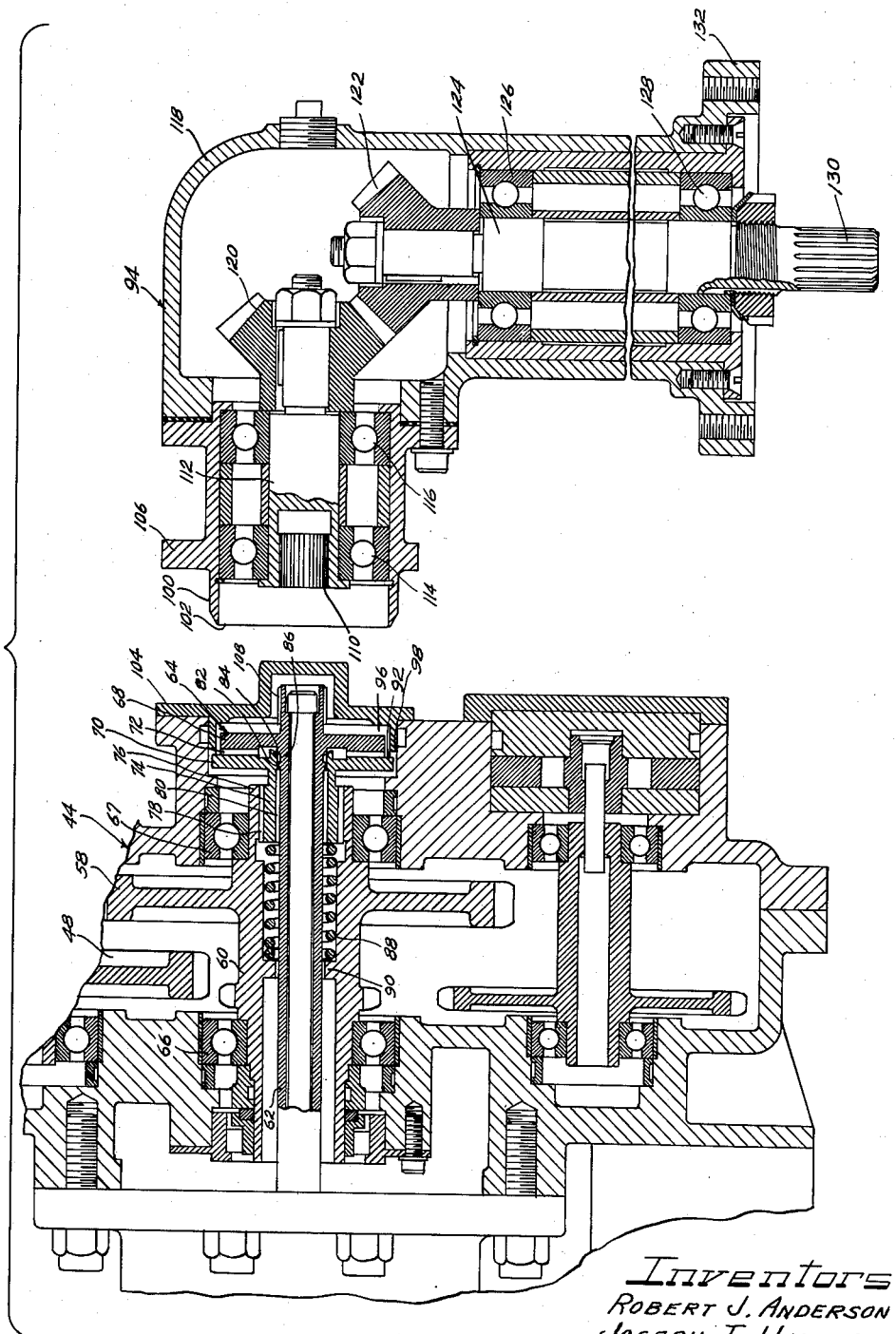

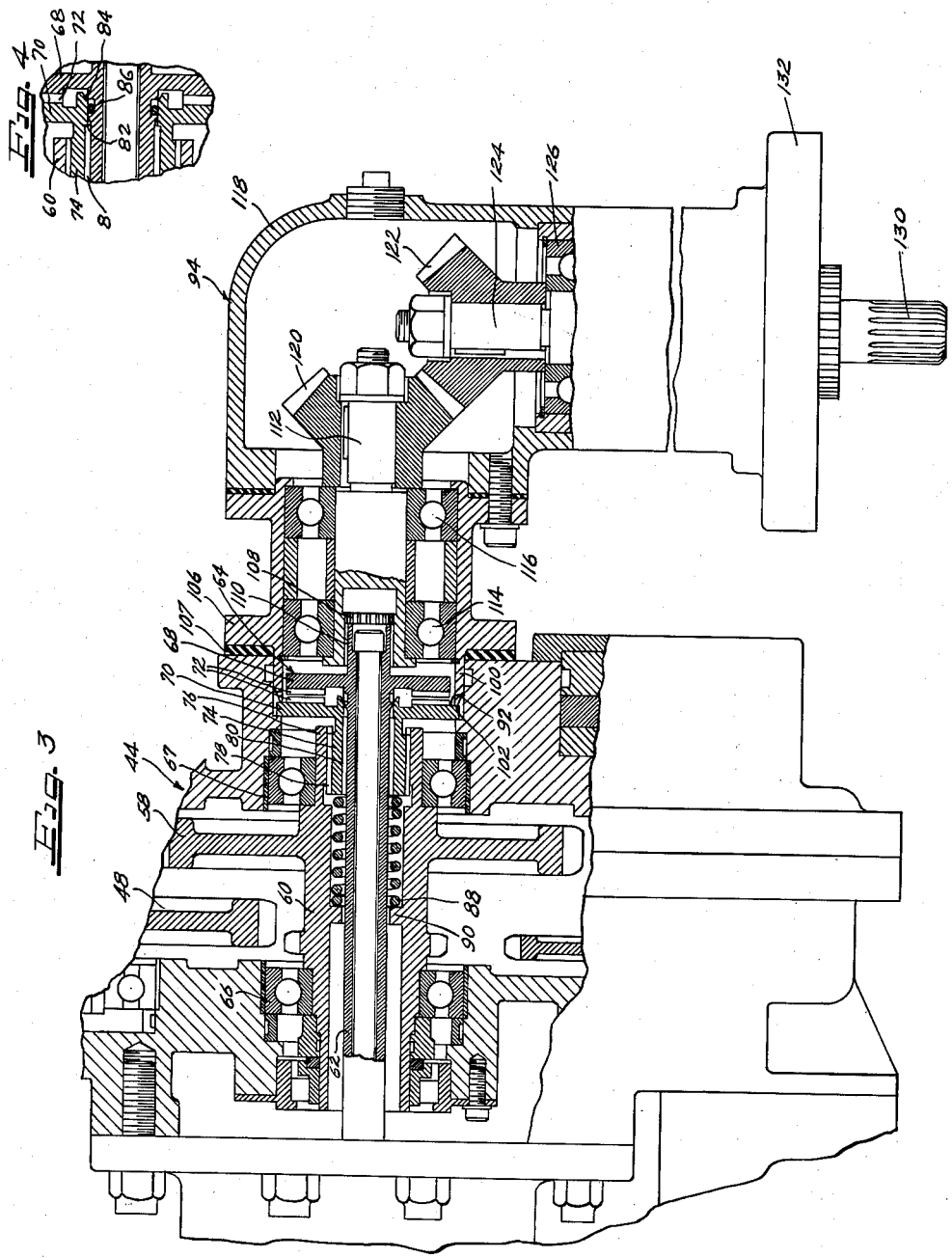

United States Patent Office 2,977,820
Patented Apr. 4, 1961

2,977,820

GROUND POWER DEVICE

Robert J. Anderson, Lyndhurst, Joseph T. Hamrick, Cleveland, and Frank L. Oppenheimer, Shaker Heights, Ohio, assignors to Thompson Ramo Wooldridge Inc., a corporation of Ohio Filed Apr. 5, 1957, Ser. No. 651,103

5 Claims. (Cl. 74—665)

The present invention relates to improvements in precision power mechanisms for generating various forms of power for a predetermined short life such as utilized in a single flight aircraft and mechanism for testing units of the power mechanism.

More specifically, in single flight aircraft such as known as rockets, guided missiles and the like, auxiliary power units are provided in addition to the main propelling power unit. These auxiliary power units supply power outputs in various forms, such as electrical power for operating steering controls, radar mechanisms and intricate computing gear and such as fluid pressure for operating lubrication systems, fuel systems and similar devices, which require fluid under pressure.

These auxiliary power units are of prime importance to the operation of such a single flight aircraft and it is essential that they be able to operate with high accuracy supplying a very maximum of power with a minimum of weight. To achieve these desirable features, the units are very intricate in construction, involving many specialized electrical and mechanical devices and yet are blended into a compact, efficient, lightweight package. Because of the demands for high power output and precision operation, and because the aircraft units are generally utilized for a single flight and are not recoverable, the auxiliary power units are constructed with a predetermined operating life, which is sufficient only to complete the flight of the aircraft on which the power unit is to be used.

Since each rocket or single flight vehicle represents a considerable investment, and because of the necessity of insuring accurate and dependable flights, it is essential to pretest the units and especially the pump and the hydraulic system dependent on the pump. This normally would require full operation of the whole auxiliary power unit. A full operational test, however, would consume some of the operating life of the auxiliary power unit thereby making it necessary to originally construct a unit possessing a greater operating life, thereby increasing the expense of production.

The units are generally constructed with a turbine which operates as a prime mover and drives a plurality of power output units through a gear train. The power output units may include a generator and a hydraulic pump. Test efforts have included operating the generator as a motor, but whereas this does not require operation of the turbine with the resulting wear of the turbine blades, it has been found that the high speeds will create frictional heat in the turbine blade chamber sometimes resulting in damage to the unit.

The present invention contemplates an operational performance test of the hydraulic pump of the auxiliary power unit in order that the fluid operated system may be tested, by operating the hydraulic pump without operating the driving turbine, the generator and other units and the gear train.

It is an object of the invention to provide auxiliary power unit of the type described wherein the hydraulic pump may be simply and effectively operated to test the pump and hydraulic system without putting unnecessary hours of operation on the gears, turbine, generator and other connected components.

Another object is to provide a method and mechanism for testing the hydraulic pump component of an auxiliary power unit reducing the power necessary for check out of the hydraulic system.

Another object of the invention is to provide an apparatus and method for testing the hydraulic system of a turbine driven power unit whereby the drive train to the hydraulic pump may be interrupted for connection of a power driven test unit for sole operation of the hydraulic pump and system.

A still further object of the invention is to provide a power output mechanism with a testing unit whereby improved and simplified attachment and drive structure for the testing unit is utilized.

Another object of the invention is to provide an improved driving train between the prime mover and driven units of a power mechanism using a simplified disconnecting clutch means which breaks the drive train and permits attachment of a power driven testing unit.

Another object of the invention is to provide an improved power mechanism having a prime mover with a drive train operating a hydraulic pump wherein a disconnectible connection is present in the drive train and an improved oil seal is utilized to prevent leakage of the oil through the disconnectible connection.

Another object of the invention is to provide a combined power mechanism and test unit therefor, wherein a clutch between the prime mover and driven mechanism of the power mechanism is automatically disconnected when a power operated testing mechanism is connected to the driven mechanism.

Other objects and advantages will become more apparent with the teaching of the features and principles of the invention in connection with the disclosure of the preferred embodiments thereof in the specification, claims and appended drawings, in which:

Figure 2 is an enlarged vertical sectional view taken through the gear train and the power driven test unit and illustrating the interior details of construction of these elements;

Figure 3 is a vertical sectional view similar to Figure 2, but illustrating the elements in engaged position; and Figure 4 is an enlarged detailed view shown in section and illustrating the construction of the inclined face for centering the clutch element with the driven shaft.

Figure 1:
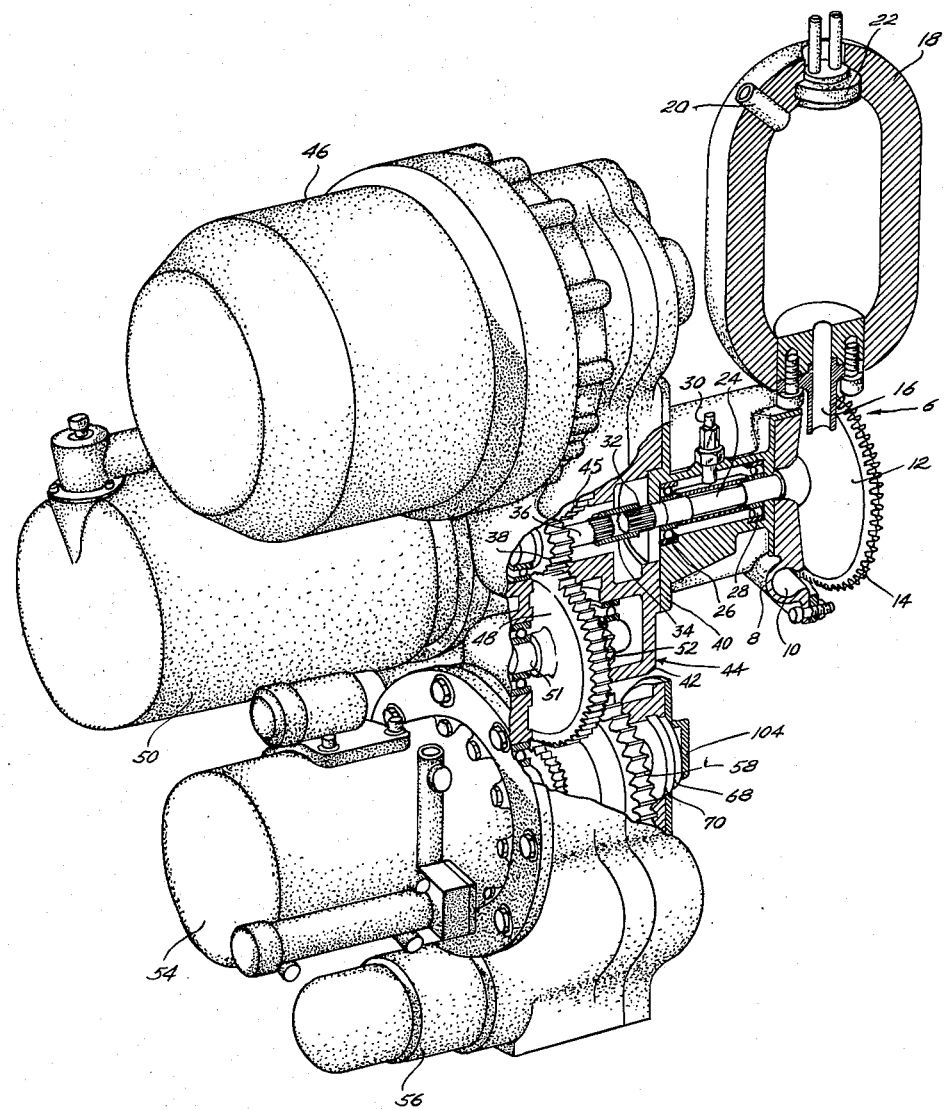
Figure 1 is a perspective view of the auxiliary power unit embodying the principles of the invention with a portion of the housing broken away to illustrate the turbine and the gear train.

The auxiliary power unit is shown as a whole in Figure 1 and the detailed relationship of the auxiliary power unit to the test unit is shown in Figures 2 and 3. While the features of the invention are particularly adapted to the utilization in the unit shown, it will be understood that the principles and advantages afforded by the invention may be employed in other environments. For purposes of illustration, the power unit or power mechanism will be described as operating a plurality of driven units, with one of said units being a hydraulic pump which is the unit to be tested without necessitating the operation of the prime mover or other driven units. As discussed above, this affords the opportunity, when the device is used with an auxiliary power unit for a single flight aircraft, or testing the entire hydraulic system without necessitating operation of the other related mechanism to shorten its operating life.

The prime mover is illustrated in the form of a gas driven turbine. The turbine 6 includes a housing 8 with a turbine gas chamber 10 and a rotating turbine wheel 12. The turbine blades 14 rotate in gas chamber 10 and are driven to rotate the rotor 12 by gas emitting from a nozzle 16.

The gas propellant for the turbine is contained in a chamber 18 heavily constructed to withstand extreme pressures. The chamber container 18 is filled through an opening closed by a plug 20 before flight and a reaction of the contents to supply a pressurized turbine-operating gas is inaugurated by a starter 22 controlled preferably by the electrical system of the aircraft. The gas producing chemical or mono-propellant may be ethylene oxide of hydrazine or the like, which is capable of creating a high pressure operating gas when reacted.

The turbine rotor 12 is mounted on a drive shaft 24 carried in bearings 26 and 28, which are supplied by lubricant through a supply fitting 30. The lubricant may be provided from a lubrication system supplied by a pump which may be one of the driven units operated by the turbine 16 which operates the plurality of units constituting the auxiliary power unit as a whole.

The turbine rotor shaft 24 is splined at its end 32 and by an internally splined sleeve 34 connects to a short shaft 36 which carries the main drive gear 38. The splined sleeve permits the assembly of the unit by connecting the turbine casing 40 to the gear casing 42, which, with the casings for the other units, constitute the housing 44 for the entire auxiliary power unit.

The drive gear 38 acts as a pinion, driving the generator operating gear 45 that drives the generator 46 in rotation and gear 38 also drives the other units 50 and 56. The pinion also drives the intermediate gear 48. The gear 48 is carried on a shaft 51 which carries a gear 52, which is part of the gear train driving a hydraulic pump 54.

The generator 46, the hydraulic pump 54 and the units 50 and 56 comprise the driven units operated through the various gears which comprise the drive train and which are driven by the prime mover which is the turbine 6. The driven units may be of various types and the structure is so arranged that the hydraulic pump 54 may be individually tested without requiring operation of the other driven units, the gear train, or the turbine to thereby avoid shortening the operating life of these units and to thereby reduce the amount of test power required.

The gear 52 meshes with gear 58, which is also shown in detail in Figures 2 and 3. Gear 58 is carried on a tubular drive sleeve 60 which coaxially surrounds the tubular drive shaft 62 that is connected directly to the hydraulic pump 54. The tubular drive sleeve 60 connects to the driven shaft 62 of the pump through a disconnectible clutch arrangement 64 which will be described in detail.

The tubular driving sleeve 60 is carried in bearings 66 and 67 at its ends which are suitably supported in the cast housing 44. These bearings support the sleeve and retain it coaxial with the pump drive shaft 62.

The clutch 64 which disconnectibly connects the driven pump shaft 62 to the driving sleeve 60 has a driven plate 68 and a driving plate 70. These plates carry interengaging radial face splines 72, which interlock when the two plates 68 and 70 are pushed together.

The movable splined clutch plate 70 carries a tubular hub 74 which telescopically fits within the end 76 of the driving sleeve 60. Between this end 76 and the hub 74 are driving splines 78 which permit the hub to slide axially, but which lock it to the driving sleeve 60 in positive rotational engagement.

The hub is loosely journaled on the driven pump shaft 62, as indicated by the space 80. The floating hub 74 and clutch plate 70 are maintained in positive coaxial relationship with the driven shaft 62 by inclined surfaces 82 and 84, as may be seen in the detail of Figure 4. The inclined surface 82 is on the driven pump shaft 62 and leads to an area of increased diameter while the tapered surface 84 is on the inside of the hub 74 of the clutch plate and causes the clutch plate and hub to ride up on the surface 82 in positive concentric relationship. Between these two inclined or tapered surfaces, 82 and 84, is located an O-ring seal 86 which is carried in a groove on the driven pump shaft 62. This seal helps to resiliently center the clutch plate 70 and also prevents the passage of fluids through this joint.

The clutch plate 70 is urged to engagement with the mating plate 68 by a coil compression spring 88 which bears against the base of the hub 74. The other end of the spring bottoms on an inwardly extending annular ridge 90 on the inside of the driving sleeve 60.

It is to be noted that the driving clutch plate 70 is of larger diameter than the driven plate 68 so that an outer radial face 92 is exposed beyond the driven clutch plate 68. The locking splines 72 stop, leaving this face 92 clear and axial pressure applied against this face will cause disengagement of the clutch. This disengagement will be effected automatically by connection of the power driven testing unit 94 as will be described.

To receive the testing unit 94, the housing 44 for the power mechanism has a circular opening 96, which is located opposite the disconnectible clutch plates 68 and 70 and which is formed by an inner annular surface 98 coaxial with the driven pump shaft 62.

The power driven testing unit 94 is provided with an annular flange 100 which is received by said inner annular surface 98 to positively position the drive mechanism of the testing unit 94. The flange 100 also has a leading edge 102 which engages the exposed face 92 of the clutch element 70 to automatically disengage the clutch when the testing unit 94 is pushed into operating position, as is shown in Figure 3. The opening 96, which was provided for testing the hydraulic system by driving the hydraulic pump 54, is covered by a removable plate 104, which is shaped to be positioned in a secured fashion over the opening 96. For operation, the cover 104 is removed and the cylindrical flange 100 is inserted into the opening 96. A stop flange 106 is provided on the test unit to limit the depth of insertion of the cylindrical surface 100 to a point where the clutch is disengaged.

Simultaneous with the disengagement of the clutch, the test unit is placed in driving relationship with the driven pump shaft 62. For this purpose, the shaft 62 is shown carrying external splines 108, which are slidably received by the internal splines 110 of the driving shaft 112 of the testing unit 94. The locking of the splines 108 and 110 permit the shaft 112 to drive the driven pump shaft 62.

The driving shaft 112 of the testing unit is carried in bearings 114 and 116 within a section of the housing 118 of the testing unit. The shaft 112 carries a beveled gear 120 in meshed engagement with a driving beveled gear 122, which is carried on the end of a shaft 124. This shaft is carried in bearings 126 and 128, and is splined at its end 130 in order that it may be power driven. Thus, the head portion of the testing unit 94 is angular in shape so that the power unit, which may be connected to the flange 132, will be away from the turbine 6, which is shown in its location relative to the mechanism in Figure 1.

Although the operation of the mechanism will now be apparent from the description of the individual elements and their relationship to the mechanism as a whole, a brief summary of operation will be helpful in understanding the objectives and features of the invention.

As illustrated in Figure 1, the auxiliary power unit for a single flight aircraft or the like is driven by a turbine 6, which through shaft 24 drives a suitable gear train to operate the driven units including the generator 46, the hydraulic pump 54, and the driven units 50 and 56. For operation on an aircraft installation, the turbine is driven by a gas generated by the contents of the pressure chamber 18. For testing of the hydraulic system, the gear drive train is interrupted, and the hydraulic pump 54 is operated by the power operated testing unit 94, the connection of which is illustrated in Figures 2 and 3.

For attachment of the power operated testing unit 94, the cover plate 104 is removed from the opening 96 to expose the clutch assembly 64 and the splined end 108 of the driven pump shaft 64. The cylindrical hub 100 is inserted into the opening 96 and the leading edge 102 is tapered for ease of insertion. This leading edge 102 engages the outer exposure area 98 of the face of the movable clutch plate 70 to force it away from the clutch plate 68 against the clutch spring 88. This unlocks the face splines 72 and permits the driven shaft 62 to be rotated independently of the tubular driving sleeve 60, which normally drives the pump shaft 62.

When the power operated testing unit 94 is temporarily attached to the housing 44 of the power mechanism, the flange 106 limits the insertion of the cylindrical flange 100 and this flange 106 may be attached to the housing 44, such as by bolts or the like, not shown. Upon attachment of the testing unit 94, the internal splines 110 are in driving relationship with the splines 108 of the pump shaft 62. The clutch plate 70 has been forced out of engagement with the clutch plate 60, and the tubular hub 74 of the sleeve slides axially with respect to the driving sleeve 60. This breaks the seal provided by the O-ring 86, which will again be sealed when clutch plate 70 is released and the tapered surface 84 of the inside of the hub 74 rides up on the inclined surface 82 of the pump shaft 62. This reorientation of the parts and reengagement of the clutch occurs when the power driven test unit 94 is removed and the cover plate 104 is replaced.

Thus, it will be seen that test operation of the hydraulic system can be achieved by operation of the hydraulic pump 54 at operational speeds without driving the associated gear train and other units, and without requiring a full operational run of the driving turbine 6. The operational life of the driving mechanism, which is limited, is, therefore, not shortened but a complete test of the hydraulic system is accomplished, nevertheless.

The test unit 94 is easily and simply attached and disconnection of the drive train is automatically effected and the parts are so related that the test unit cannot be connected without disconnection of the normal drive train leading from the turbine.

The mechanism thus provided meets the objectives and advantages hereinbefore set forth and provides a simplified and effective combination for operating and testing elements of the power mechanism. The power driven testing unit 94 may be reutilized for rapidly and sequentially testing a series of power mechanisms and after testing, the power mechanisms will be quickly restored to their operating conditions whereupon they will be ready for operation in flight.

We have, in the drawings and specification, presented a detailed disclosure of the preferred embodiment of our invention, but it is to be understood that we do not intend to limit the invention to the specific form disclosed, but intend to cover all modifications, changes and alternative constructions falling within the scope of the principles taught by our invention.

We claim as our invention:

1. A power mechanism comprising a prime mover adapted for high speed operation over a limited operating life, a driven unit for supplying power during its operation to a single flight aircraft or the like, a drive train operationally connecting the prime mover to the driven unit, a disengageable clutch means in the drive train leading to the driven unit, a housing surrounding the prime mover and the driven unit and having a test opening adjacent said clutch means with an annular wall therein, a power operated testing unit to be connected to the drive train on the driven side of said clutch, a cylindrical projection on the power operated testing unit adapted to be received by said annular opening in said housing and to project therein, said cylindrical projection having a clutch engaging surface whereby the clutch is automatically disengaged when the cylindrical projection is inserted into the annular opening, and means for automatically connecting the power operated testing unit to the driven unit when said cylindrical projection is inserted into the annular opening whereby the driven unit is driven at operational speeds without driving the prime mover or the drive train to shorten the operating life thereof.

2. In a power mechanism of the type having a limited operating life for use in a single flight aircraft or the like including a testing unit and an operating unit having a prime mover and driven unit with a drive train therebetween, a combination in the drive train comprising a driven shaft connected to a unit to be tested, a coaxial tubular drive sleeve surrounding the driven shaft and adapted to be connected in driving relationship therewith, a pair of clutch plates having a driving plate and a driven plate secured to said driven shaft, an extension on the clutch driving plate rotationally secured to said tubular sleeve but axially movable with respect thereto whereby said clutch driven plate may be axially moved into engagement with the driving plate, disengaging means connected to the driving plate for forcing the driving clutch plate to disengaged position, spring means urging the clutch driving plates to engaged position, and connecting means at the end of the driven shaft for connecting a power operating testing means and positioned near said disengaging means whereby said testing means simultaneously engages said disengaging means to disengage the clutch whereby the tested unit may be operated without operating the driving sleeve.

3. In a power mechanism of the type having a limited operating life for use in a single flight aircraft or the like including a testing unit and an operating unit having a prime mover and driven unit with a drive train therebetween, a combination in the drive train comprising, a driven shaft connecting to a unit to be tested, means connected to the shaft for securing a power driven testing member whereby the shaft may be directly driven during testing, a driving member coaxially related to the drive shaft and adapted to be driven by a prime mover, a driven clutch plate having a radial face connected to the driven shaft, a driving clutch plate having a mating radial face and adapted for connection to the driving unit, an annular sliding hub connected to the driving plate of the clutch and keyed to rotate with the coaxial driving member, a tapered external face on the driven shaft opposite the sliding hub, and means for moving the hub over said tapered face to center the hub and driving clutch plate during driving relationship between the driven shaft and the driving sleeve.

4. In a power mechanism of the type having a limited operating life for use in a single flight aircraft or the like including a testing unit and an operating unit having a prime mover and driven unit with a drive train therebetween, a combination in the drive train comprising a driven shaft connected to a hydraulic pump unit to be tested, a tubular driving sleeve coaxial with the driven shaft, a clutch having a driven plate secured to the shaft and a driving plate secured to the driving sleeve, a slidable hub connected to the driving clutch plate located coaxial with the driven shaft and connected to the driving sleeve in a non-rotational manner, a tapered surface between the hub and the driving shaft whereby the two are in snug fitting relationship when the clutch plates are engaged, and an O-ring seal between the engaging surfaces of the tapered surface whereby a centering seal is provided preventing the passage of fluids.

5. A power mechanism comprising a prime mover adapted for high speed operation over a limited operating life, a driven unit for supplying power during its operation to a single flight aircraft or the like, a drive train operationally connecting the prime mover to the driven unit and including a driven shaft connected to the driven unit and including a driving member positioned adjacent the end and surrounding and coaxial with the driven shaft and connected to be driven by the prime mover, said driving member being axially shiftable relative to the shaft between an engaged position in driving engagement with said driven shaft and a disengaged position disconnected from said driven shaft, means biasing the driving member outwardly toward the end of the shaft to the engaged position, connecting means on the end of the driven shaft, and a power operated test unit having a drive connector for engaging and connecting to the connecting means on the end of the driven shaft, and a projection on said test unit spaced radially outwardly from said drive connector and positioned to engage said driving member and move it axially to said disengaged position, said connecting means and said drive connector positioned to be incapable of engagement until the projection disengages said driving member from said driven shaft.

References Cited in the file of this patent

UNITED STATES PATENTS

| | | |
|---|---|---|
| 2,184,032 | Allen | Dec. 19, 1939 |
| 2,195,139 | Waseige | Mar. 26, 1940 |
| 2,896,475 | Garnier | July 28, 1959 |